United States Patent
Mizuno et al.

(10) Patent No.: US 12,461,270 B2
(45) Date of Patent: Nov. 4, 2025

(54) STREAMING OF SUB-TITLED DATA AND PROCESSING MODEL FOR FIBER OPTICS SEISMIC OPERATION

(71) Applicant: Schlumberger Technology Corporation, Sugar Land, TX (US)

(72) Inventors: Takashi Mizuno, Houston, TX (US); Joel Herve Le Calvez, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/639,555

(22) Filed: Apr. 18, 2024

(65) Prior Publication Data

US 2024/0369730 A1    Nov. 7, 2024

Related U.S. Application Data

(60) Provisional application No. 63/496,742, filed on Apr. 18, 2023.

(51) Int. Cl.
| | |
|---|---|
| *G01V 1/50* | (2006.01) |
| *E21B 49/00* | (2006.01) |
| *G01V 1/22* | (2006.01) |

(52) U.S. Cl.
CPC .............. *G01V 1/50* (2013.01); *E21B 49/00* (2013.01); *G01V 1/226* (2013.01); *G01V 2210/322* (2013.01); *G01V 2210/34* (2013.01)

(58) Field of Classification Search
CPC .... G01V 1/50; G01V 1/226; G01V 2210/322; G01V 2210/34; F21B 49/00
See application file for complete search history.

(56) References Cited

U.S. PATENT DOCUMENTS

| | | | |
|---|---|---|---|
| 2015/0241581 A1* | 8/2015 | Gunturu ................ | G01V 1/345 367/11 |
| 2016/0154142 A1* | 6/2016 | Stokely ................ | G01V 11/002 73/152.58 |

(Continued)

OTHER PUBLICATIONS

International Search Report and Written Opinion of International patent application No. PCT/US2024/025241, mailed Aug. 5, 2024, 11 pages.

*Primary Examiner* — Michael J Dalbo
*Assistant Examiner* — Kaleria Knox
(74) *Attorney, Agent, or Firm* — Jeffrey D. Frantz

(57) ABSTRACT

Systems and methods may be used to process distributed acoustic sensing (DAS) data at oil and gas well sites to generate processed seismic data having metadata superimposed thereon, and then stream the combined processed seismic data and metadata to an off-site data processing center for further customized data processing. For example, a method may include receiving raw seismic data from a plurality of sensors disposed in a borehole extending into a subterranean formation from the oil and gas well site, processing the raw seismic data to generate a plurality of processed seismic data waveforms and metadata associated with the plurality of processed seismic data waveforms, combining the plurality of processed seismic data waveforms and the metadata associated with the plurality of processed seismic data waveforms to generate an output file, and streaming the output file to an off-site data processing center that is located remotely from the oil and gas well site.

11 Claims, 8 Drawing Sheets

(56) References Cited

U.S. PATENT DOCUMENTS

| | | | |
|---|---|---|---|
| 2020/0200943 A1* | 6/2020 | Adeyemi | G01D 5/35306 |
| 2022/0244418 A1* | 8/2022 | Davies | E21B 49/00 |
| 2022/0307895 A1 | 9/2022 | Mizuno et al. | |

* cited by examiner

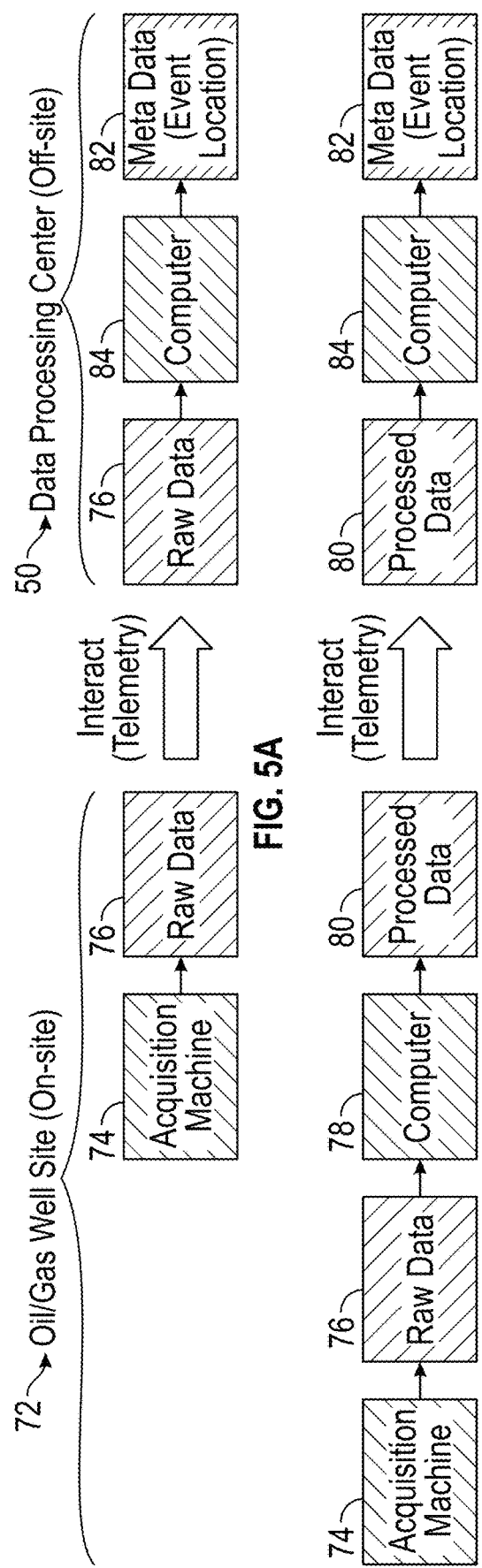
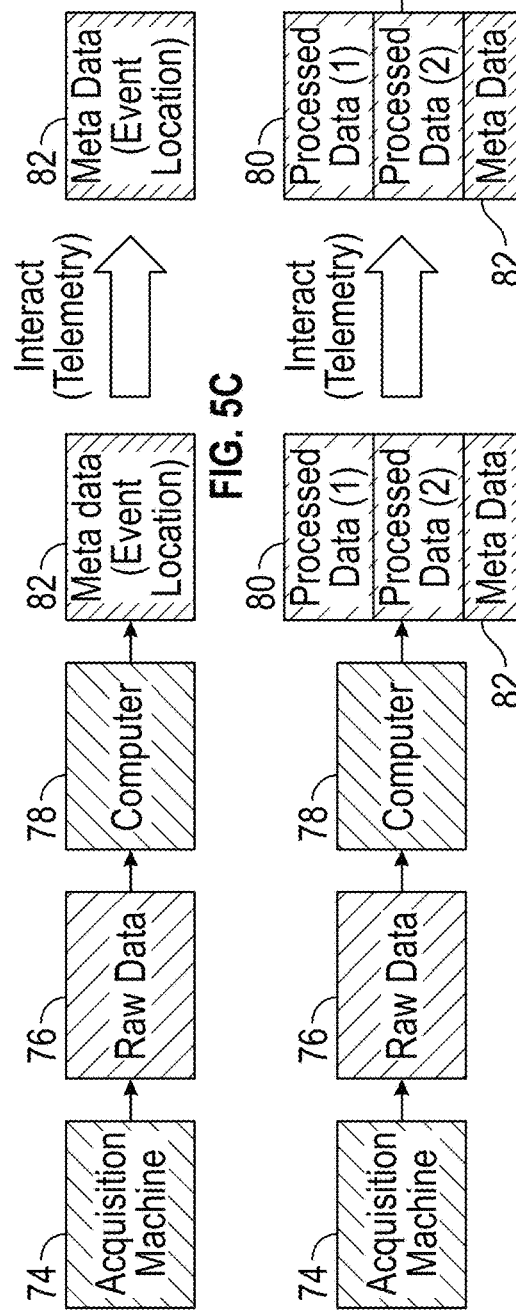
FIG. 5A
FIG. 5B
FIG. 5C
FIG. 5D

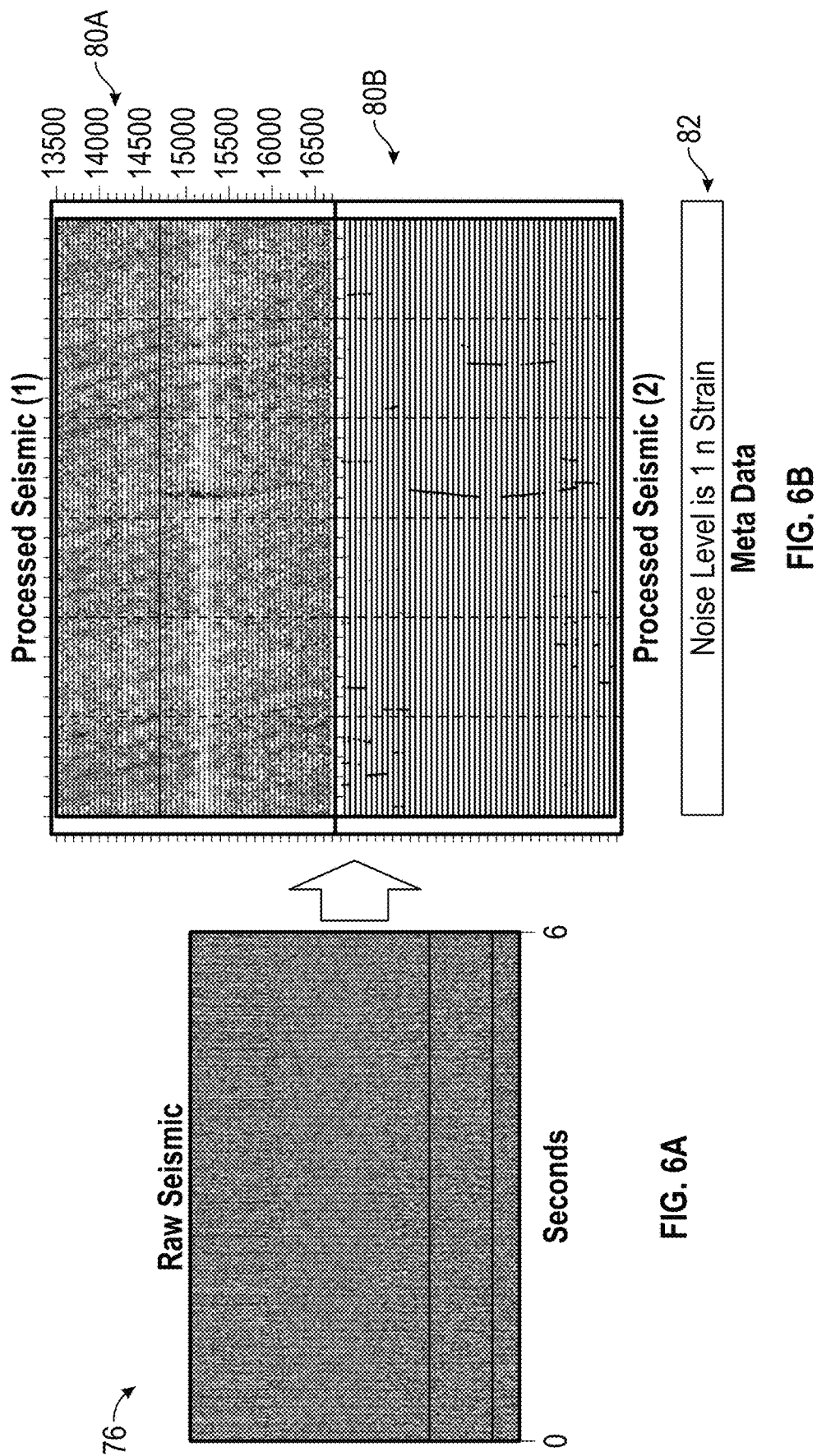

STREAMING OF SUB-TITLED DATA AND PROCESSING MODEL FOR FIBER OPTICS SEISMIC OPERATION

BACKGROUND

The present disclosure relates to processing distributed acoustic sensing (DAS) data at oil and gas well sites to generate processed seismic data having metadata superimposed thereon, and then streaming the combined processed seismic data and metadata to an off-site data processing center for further customized data processing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Oil and gas exploration and production is a remarkably complex endeavor. A variety of surface and downhole measurement tools may be used to identify areas of a geological formation that may contain materials of interest, such as hydrocarbon reserves. A recent development of optical fiber-based seismic sensing technologies such as DAS provide industries (e.g., oil and gas industry) with new options for seismic sensing. For example, in borehole seismic, the DAS provides a viable alternative to downhole particle motion sensor (e.g., geophone, accelerometer, and so forth) arrays with high sensor count, flexible deployment, and long-term operation. Unlike geophone-based acquisition systems, optical fiber-based acquisition systems may measure physical properties (e.g., strain, temperature, and so forth) other than particle motions (e.g., velocities, accelerations, and so forth).

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes receiving raw seismic data from a plurality of sensors disposed in a borehole extending into a subterranean formation from the oil and gas well site. In addition, in certain embodiments, the method may include processing the raw seismic data to generate a plurality of processed seismic data waveforms and metadata associated with the plurality of processed seismic data waveforms. In addition, in certain embodiments, the method may include combining the plurality of processed seismic data waveforms and the metadata associated with the plurality of processed seismic data waveforms to generate an output file. In addition, in certain embodiments, the method may include streaming the output file to an off-site data processing center that is located remotely from the oil and gas well site.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 5A through 5D illustrate various workflows for processing and transmitting seismic monitoring data from an oil and gas well site, in accordance with embodiments of the present disclosure;

FIGS. 6A and 6B illustrate an example of output generated by the workflow illustrated in FIG. 5D, in accordance with embodiments of the present disclosure;

DETAILED DESCRIPTION

Figure 1:
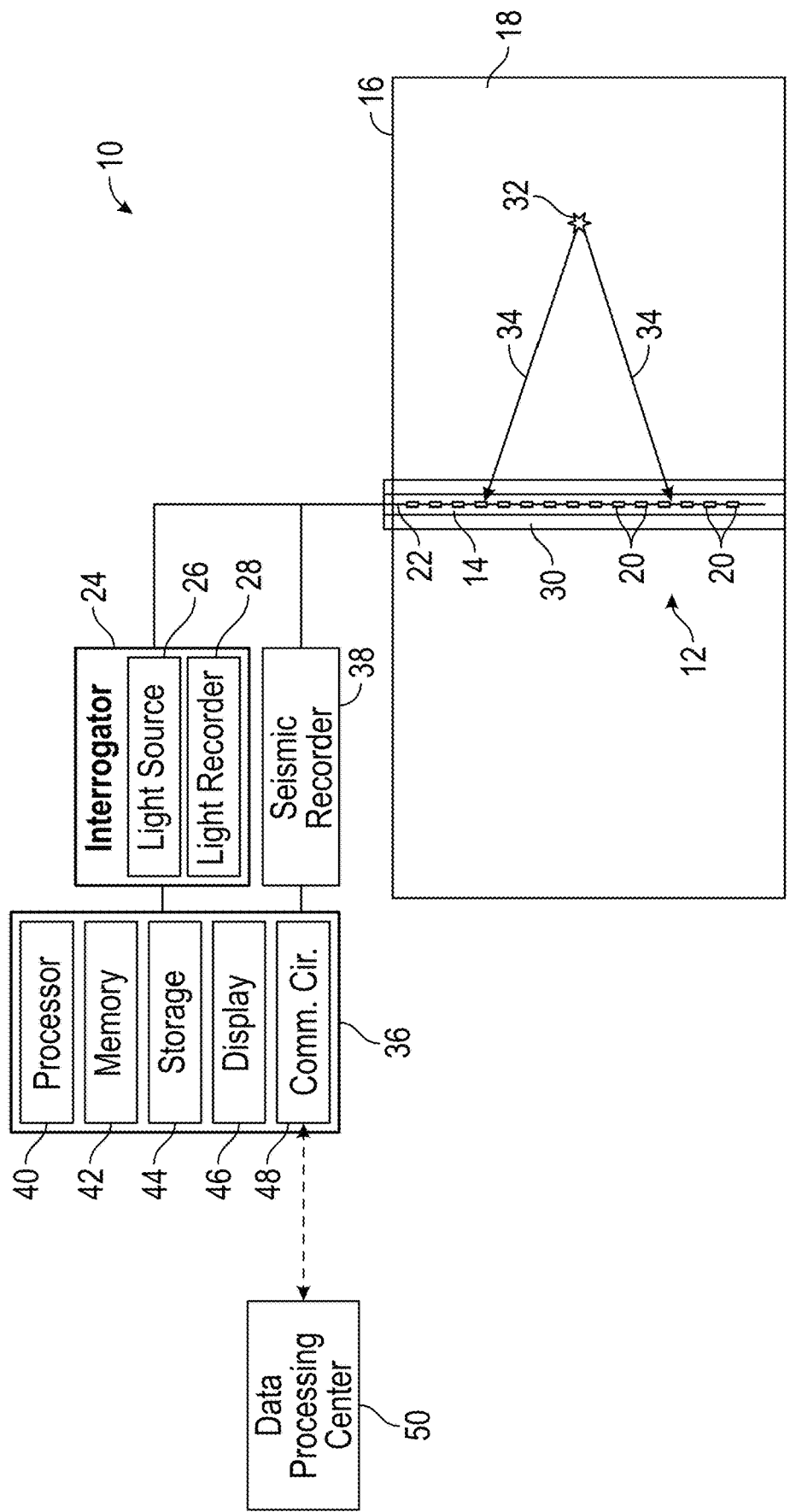
FIG. 1 illustrates a schematic diagram of an oil and gas well system having a fiber-optic sensor array in a wireline deployment and a passive seismic source, in accordance with embodiments of the present disclosure.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and operation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "certain embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth being the lowest (e.g., downhole or lower) point, whether the well (e.g., wellbore, borehole) is vertical, horizontal or slanted relative to the surface.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequently, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a control system (i.e., solely by the control system, without human intervention).

In addition, as used herein, the terms "on-site" or "local" are intended to describe equipment and computer systems that are located in a confined area (e.g., both on the surface and in subterranean formation located underneath the surface) of an oil and gas well site that is specifically used to perform oil and gas well site operations. For example, an on-site area of an oil and gas well site may be confined by a guarded perimeter within which only authorized oil and gas well operators may enter. In contrast, as used herein, the terms "off-site" or "remote" are intended to described equipment and computer systems that are located in places that are not "on-site" or "local" with respect to an oil and gas well site that is specifically used to perform oil and gas well site operations, and are not even located adjacent an oil and gas well site that is specifically used to perform oil and gas well site operations. For example, an "off-site" or "remote" data processing center may be located many miles away from a perimeter of a particular oil and gas well site and, indeed, may be located several states away from a particular oil and gas well site or even several countries away from a particular oil and gas well site.

In seismic sensing, near-surface seismic monitoring may have insufficient spatio-temporal resolutions caused by a limited seismic sensor density (e.g., limited by deployment difficulties or cost effectiveness). Recent development of optical fiber-based seismic sensing technologies such as distributed acoustic sensing (DAS) transforms fiber-optic cables into dense seismic sensor arrays, therefore providing the oil and gas industry with new options for seismic sensing. For instance, the DAS may provide higher sensor count, more flexible deployment, and long-term operation capability in comparison to particle motion sensors such as geophones and accelerometers. In certain embodiments, the DAS may include heterodyne Distributed Vibration Sensing (hDVS) that may enable new high-performance applications such as efficiently conducting borehole seismic and flow profiling applications.

The DAS may be used in various geophysical applications such as borehole seismic, surface seismic, shallow wellbore seismic, and so on. For example, DAS-based seismic acquisition systems may be used in borehole seismic to passively (e.g., without using controlled seismic sources) measure borehole seismic data for applications such as reservoir characterization and micro-seismic. The borehole seismic data may include seismic data (e.g., P-waves, S-waves, converted waves) measured using receivers (e.g., seismic sensors) in a well (e.g., a cased well or an open well). The borehole seismic data may be measured by DAS systems during or after drillings of exploration and appraisal wells. In some cases, subsurface imaging may use 3D vertical seismic profile (VSP) technology for improved imaging quality (e.g., high resolutions). The DAS systems may reduce VSP acquisition time from a few hours (e.g., using conventional seismic operations) to a few minutes. In certain embodiments, a fiber-optic sensor array may be used in geophysical applications. Fiber-optic sensors may be based on the DAS. Unlike particle motion sensors, the fiber-optic sensors may measure strains caused by seismic waves traveling along the sensor array.

Optical fiber implementations enable a wide range of subsurface sensing topics, including passive seismic monitoring. The acquisition of passive seismic monitoring data is useful in a number of industries, such as the oil and gas industry, the carbon capture and sequestration (CCS) industry, the geothermal industry, and so forth. The mining industry will also soon increase its focus on passive seismic monitoring as well as with various government bodies pushing for a more sustainable and environmentally aware political environment. In addition, passive seismic monitoring used to be relatively expensive. However, as costs have continued to decrease, the benefits of passive seismic monitoring have begun to greatly outweigh such costs.

When it comes to the oil and gas, CCS, and geothermal industries, one of the main reasons to perform a passive seismic monitoring survey is to obtain information on ongoing deformation associated with production and/or injection.

Due to the volume of data acquired by DAS systems, as well as Distributed Temperature Sensing (DTS) systems and/or Distributed Strain Sensing (DSS) systems, known in their general term as D×S systems, and the fortunate availability of high-performance computation systems, an edge computation model seems to be the best fit. The workflow approach described herein enables for the large volumes of data to remain on-site where they are acquired (e.g., as opposed to being transferred to an office/processing location off-site) and to be processed locally using optimized algorithms leveraging powerful processing systems running on CPUs and, more and more, GPUs. However, due to the nature of scientific problems to be addressed, data interpretation has several sources of uncertainties associated therewith. Therefore, the processing results obtained at the edge have their own uncertainties. Thus, the application of an edge computation model is somewhat limited.

The embodiments described herein propose another data stream for the data from an oil and gas well site to an off-site (i.e., remote) computation center. For example, processed raw data together with metadata (e.g., subtitles) or other processed results are simultaneously streamed at the edge to the off-site computation center. This approach still fits the data upload infrastructure, but enables the provision of edge-processed results as a supplement to the raw data, thereby enhancing understanding of the data. This approach may be compared to providing subtitles on a television screen during broadcasting of programming, such as a sports game. The embodiments described herein provide an additional dimension to the overall understanding of what is happening at the oil and gas well site. This model also enables a flexible charge model (equivalent to a pay-per-view) to the customer depending on the content of the metadata and processed data.

With the preceding in mind, turning now to the figures, FIG. 1 illustrates a schematic diagram of an oil and gas well system 10 having a fiber-optic sensor array in a wireline deployment and a passive seismic source. A sensor array 12 may be deployed in a borehole 14 that is drilled from a surface 16 into a subterranean formation 18. The sensor array 12 may include fiber-optic sensors 20. The fiber-optic sensors 20 may measure strains caused by seismic wavefields traveling along the sensor array 12. For example, an optical fiber cable 22 may enclose the fiber-optic sensors 20 to provide protections in a harsh borehole environment. An interrogator 24 may provide a light source (e.g., laser) 26 and a light recorder 28 configured to record light detections (e.g., detections of back scattered light signals from the fiber-optic sensors 20). In certain embodiments, the optical fiber cable 22, the interrogator 24, and the other relevant devices or components (e.g., power supplies, control circuitry, cables) may form a Rayleigh scattering based distributed acoustic sensing (DAS) system, which may use the optical fiber cable 22 to provide a distributed strain sensing. That is, the optical fiber cable 22 may become a sensing element, therefore enabling higher sensor count (e.g., densely distributed fiber-optic sensors 20), more flexible deployment (e.g., flexibility of the optical fiber cable 22), and long-term operation capability (e.g., durability of the optical fiber cable 22) in comparison to other seismic sensors such as geophones and accelerometers. The DAS system may enable acoustic frequency strain signals to be detected over large distances (e.g., a length of the well) and in relatively harsh environments (e.g., a borehole environment).

Using the DAS system may improve efficiencies of borehole seismic operations and reduce operational cost. Certain conventional borehole seismic tools may no longer be used in the borehole seismic operations. For example, operations like rigging loggers up and down along the borehole 14 may be eliminated or reduced as the fiber-optic sensors 20 are stationary in the borehole 14 while recording strains in conjunction with other stationary logging devices.

The optical fiber cable 22 may include one or more optical fibers on which the fiber-optic sensors 20 are distributed. The one or more optical fibers may be single mode or multi-mode optical fibers. In certain embodiments, the fiber-optic sensors 20 may be integrated into the one or more optical fibers using technologies such as distributed Bragg reflector (DBR) that may cause a partial reflection of an optical wave along the optical fiber cable 22. In addition, in certain embodiments, the optical fiber cable 22 may include one or more claddings to provide protections for the one or more optical fibers.

The borehole 14 may be surrounded by borehole casings 30. The borehole 14 may refer to a drilling well inside a wellbore wall or a rock face that bounds the drilling well. The borehole 14 may be a cased well or an open well. In certain embodiments, the borehole casings 30 may include pipes lowered into an open well and cemented in place. The borehole casings 30 may be configured to withstand a variety of forces, such as collapse, burst, and tensile, as well as chemically aggressive brines.

During a borehole seismic acquisition, a passive seismic event 32 (e.g., earthquake) may generate a plurality of seismic wavefields 34 that travel in various directions within the subterranean formation 18, and some of the seismic wavefields 34 may arrive at the sensor array 12, where they are measured by a corresponding sensor (e.g., one of the fiber-optic sensors 20). The passive seismic event 32 may include, but is not limited to, naturally-occurring events such as earthquakes caused by tectonics, volcanic activity, tidal forces, and so forth; induced events by human activities like oil/gas production and fluid injections; and so forth. In certain embodiments, the sensor array 12 may be connected to an optical fiber cable 22, which may be further connected to a control system 36, a seismic recorder 38, and the interrogator 24, for example, via a wireline cable or other suitable cable. In certain embodiments, the seismic recorder 38 and the interrogator 24 may be integrated into the control system 36. However, in other embodiments, the seismic recorder 38 and the interrogator 24 may be separate from the control system 36.

The control system 36 may be configured to control operations of the sensor array 12, provide certain signal sources (e.g., light source for the fiber-optic sensors 20), and receive and process data acquired by the sensor array 12. In certain embodiments, the control system 36 may include one or more processor(s) 40, memory 42, storage 44, a display 46, and communication circuitry 48. The interrogator 24 may receive light signals from the fiber-optic sensors 20 and convert the light signals into fiber sensor data. The processor(s) 40 may receive the fiber sensor data from the interrogator 24. Data analysis and data processing based on the received data may be executed by the processor(s) 40 using processor-executable code stored in the memory 42 and/or the storage 44. The analyzed and processed data may be stored in the storage 44 for later usage. Analytic and processing results may be displayed via the display 46. Based on the analytic and processing results, the processor(s) 40 may adjust (e.g., automatically adjust, in certain embodiments) operations of the interrogator 24 (e.g., source light signals provided light by the light source 26) or the seismic recorder 38 to adjust the borehole seismic acquisition. In certain embodiments, the processor(s) 40 may generate notification to users (e.g., well operators) based on the analytic and processing results via the communication interface.

In addition, as described in greater detail herein, the communication circuitry 48 may simultaneously stream processed raw data together with metadata or other processed results at the edge to an off-site (e.g., remote) data processing center 50.

As discussed above, the interrogator 24 may include a light source 26 that may provide source light signals (e.g., laser impulses) for the fiber-optic sensors 20. For example, in certain embodiments, the light source 26 may include wavelength tunable lasers (e.g., semiconductor lasers), such as distributed Bragg reflector (DBR) laser, vertical cavity surface-emitting laser (VCSEL), external cavity laser, distributed feedback (DFB) laser, or other suitable lasers.

As also discussed above, the interrogator 24 may also include a light recorder 28 that may receive light signals (e.g., back scattered light signals associated with local measurement of dynamic strains caused by incident seismic wavefields 34) from the fiber-optic sensors 20, convert the light signals to electrical signals (e.g., using photodetectors), and further convert (e.g., digitalize) the electrical signals into the fiber sensor data. In certain embodiments, the photodetectors may include a PIN photodiode (e.g., InGaAs PIN, GaAs PIN, or Si PIN), an avalanche photodiode (e.g., InGaAs avalanche, GaAs avalanche, or Si avalanche), or other suitable photodetector (e.g., Schottky, GaP, Ge, InAs, InAsSb, or HgCdTe photodiode).

The processor(s) 40 may be any type of computer processor or microprocessor capable of executing computer-executable code. The processor(s) 40 may include single-threaded processor(s), multi-threaded processor(s), or both. The processor(s) 40 may also include hardware-based processor(s) each including one or more cores. The processor(s) 40 may include general purpose processor(s), special purpose processor(s), or both. The processor(s) 40 may be communicatively coupled to other internal components (such as interrogator 24, seismic recorder 38, memory 42, storage 44, and display 46).

The memory 42 and the storage 44 may be any suitable articles of manufacture that can serve as media to store processor-executable code, data, or the like. These articles of manufacture may represent computer-readable media (e.g., any suitable form of memory or storage) that may store the processor-executable code used by the processor(s) 40 to perform the presently disclosed techniques. The memory 42 and the storage 44 may also be used to store data described (e.g., fiber sensor data, and so forth), various other software applications for data analysis and data processing. In certain embodiments, the memory 42 and the storage 44 may include one or more databases to store additional data such as historical data (borehole seismic data acquired in previous operations) that may be used for borehole seismic monitoring. The memory 42 and the storage 44 may represent non-transitory computer-readable media (e.g., any suitable form of memory or storage) that may store the processor-executable code used by the processor(s) 40 to perform various techniques described herein. It should be noted that non-transitory merely indicates that the media is tangible and not a signal.

The display 46 may operate to depict visualizations associated with software or executable code being processed by the processor(s) 40. In certain embodiments, the display 46 may be a touch display capable of receiving inputs from a user (e.g., a well operator or a data processor) of the control system 36. The display 46 may be any suitable type of display, such as a liquid crystal display (LCD), plasma display, or an organic light emitting diode (OLED) display, for example. Additionally, in certain embodiments, the display 46 may be provided in conjunction with a touch-sensitive mechanism (e.g., a touch screen) that may function as part of a control interface for the control system 36. It should be noted that the components described above with regard to the control system 36 are example components and the control system 36 may include additional or fewer components as shown.

Figure 2:
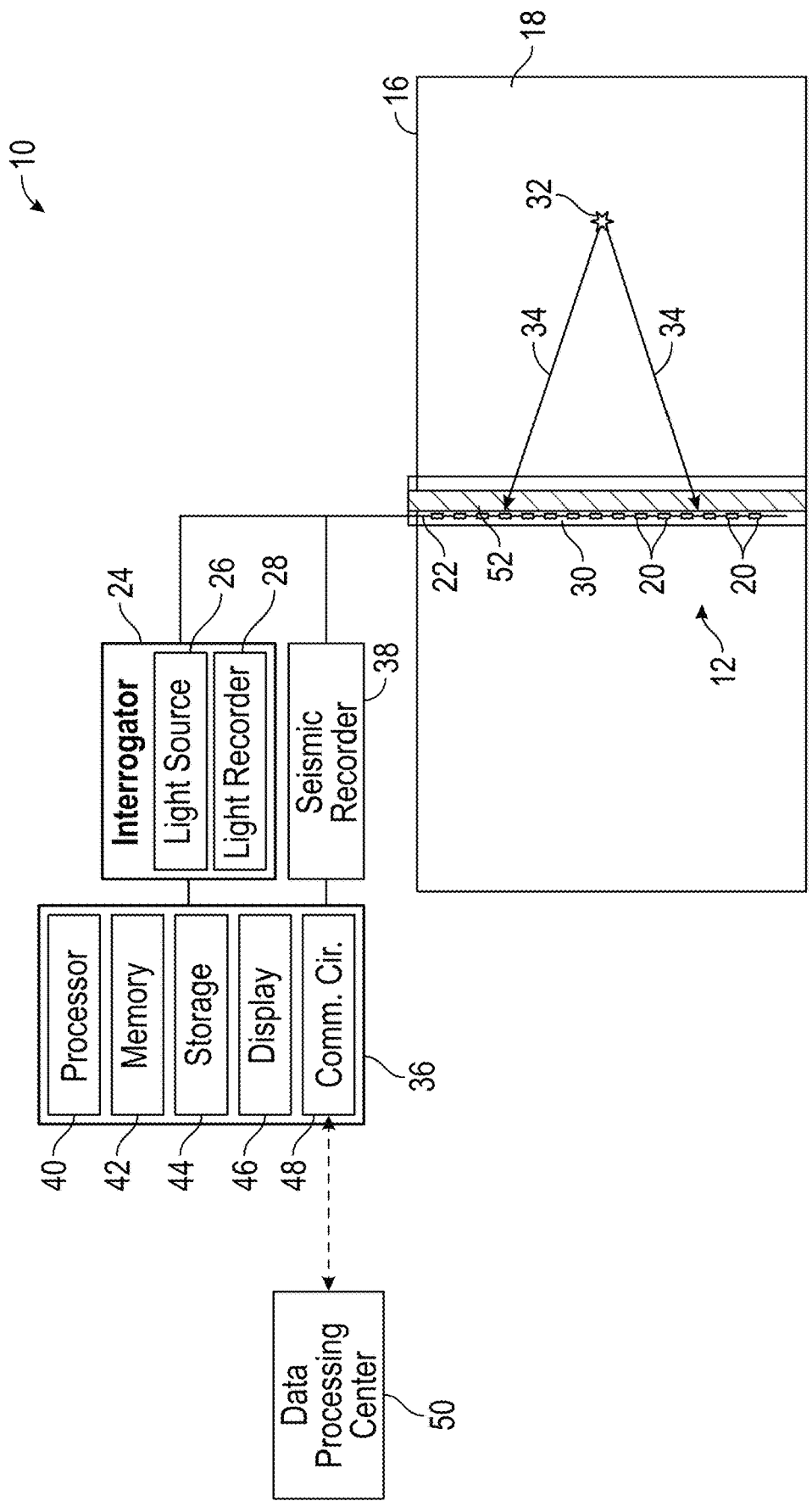
FIG. 2 illustrates a schematic diagram of the oil and gas well system having the fiber-optic sensor array in a completion deployment and a passive seismic source, in accordance with embodiments of the present disclosure.
Figure 3:
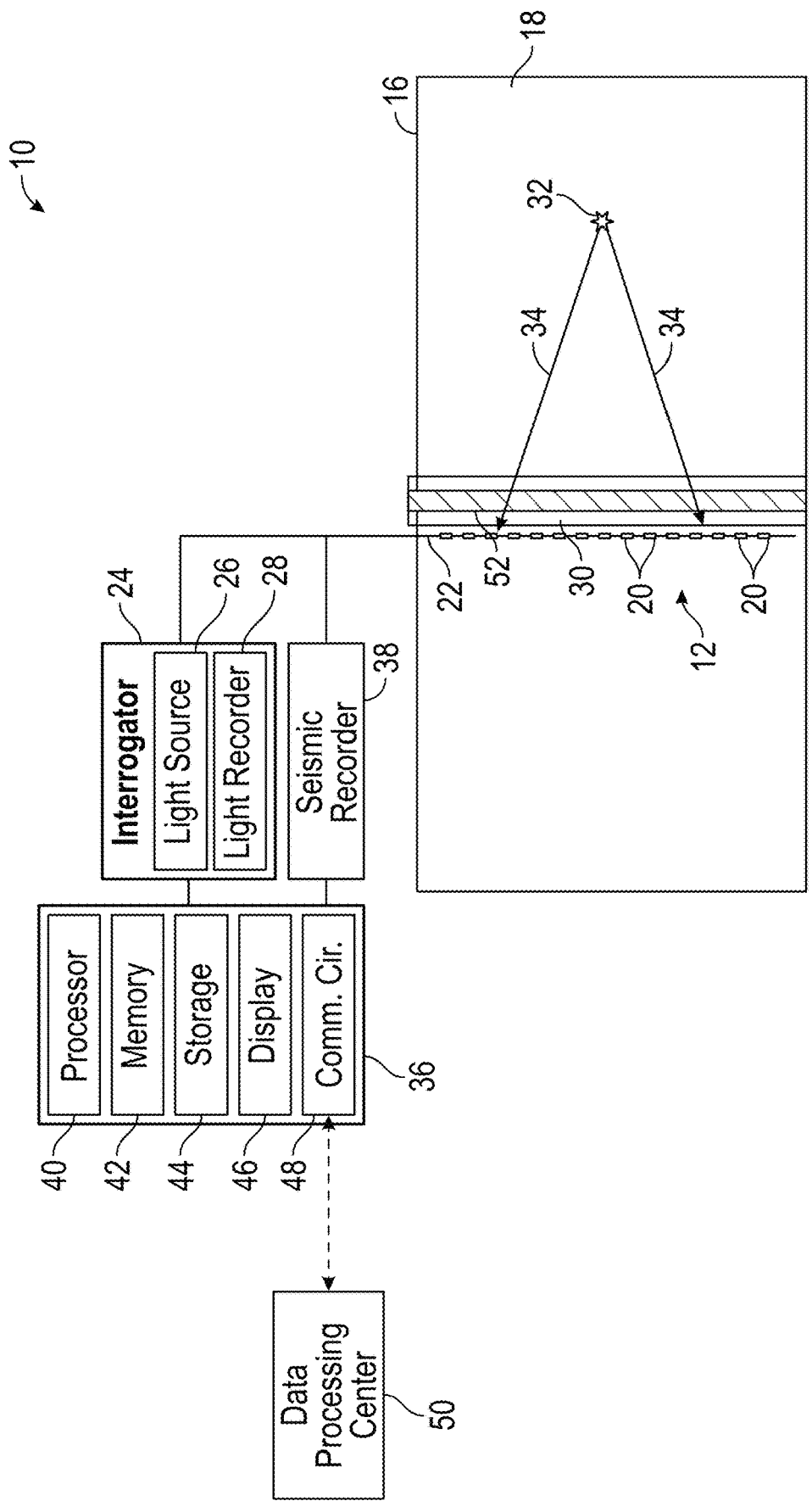
FIG. 3 illustrates a schematic diagram of the oil and gas well system having the fiber-optic sensor array in a permanent deployment and a passive seismic source, in accordance with embodiments of the present disclosure.

Besides a deployment illustrated in FIG. 1, in certain embodiments, the sensor array 12 may be deployed in other locations to acquire the borehole seismic data. For example, FIG. 2 illustrates a schematic diagram of the oil and gas well system 10 having the sensor array 12 in a completion deployment and the passive seismic source 32. The completion deployment may be used in a well completion, which is a process of configuring a well ready for a production (e.g., oil or gas) or an injection (e.g., $CO_2$ injection). For example, the well completion may include running in production tubing 52 and associated downhole tools as well as perforating and stimulating. In other embodiments, the sensor array 12 may be coupled to the production tubing 52. For another example, FIG. 3 illustrates a schematic diagram of the oil and gas well system 10 having the sensor array 12 in a permanent deployment and the passive seismic source 32. The permanent deployment may be used in a production well after the well completion. The sensor array 12 may be permanently cemented behind the borehole casings 30.

Figure 4:
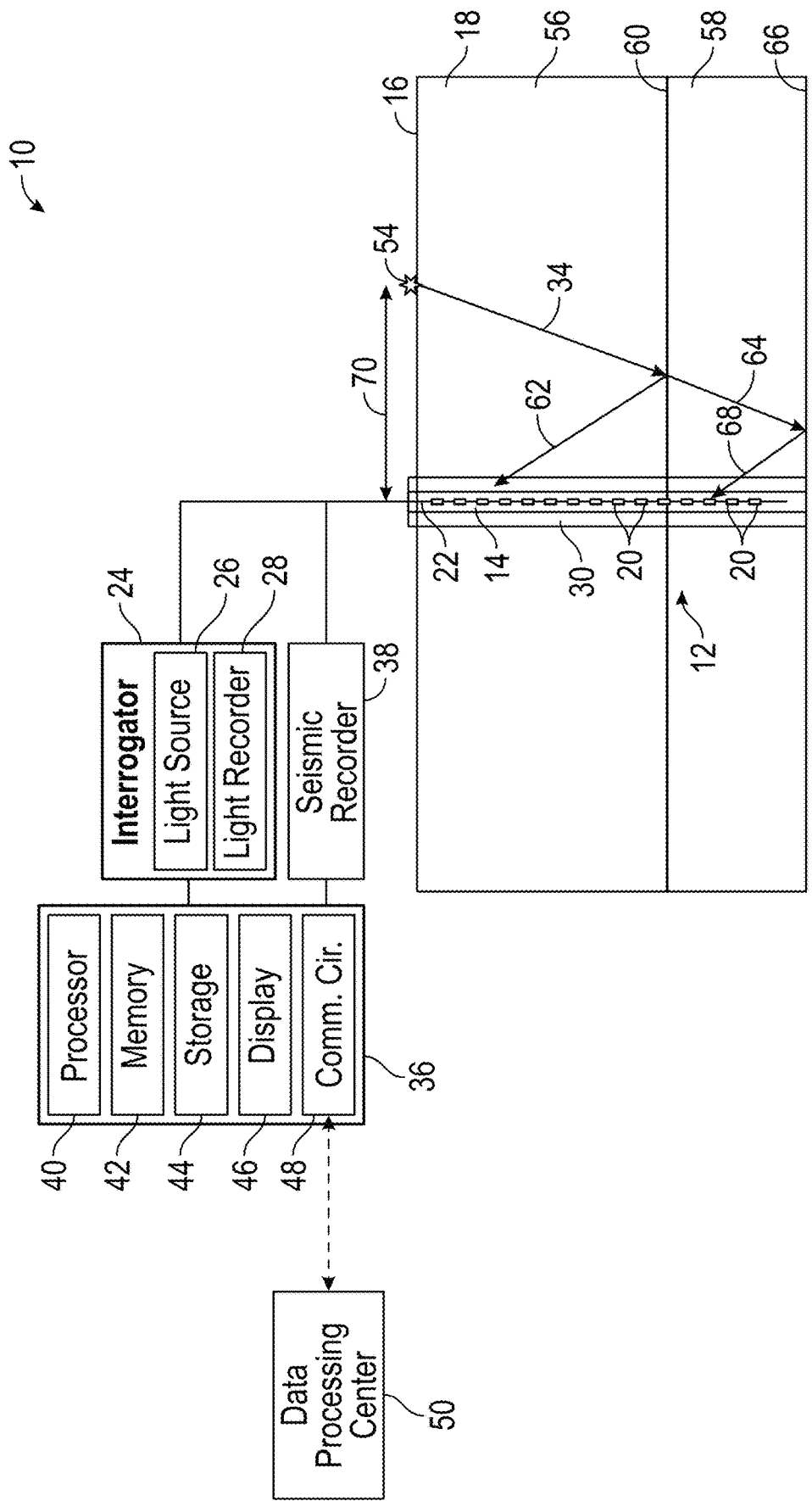
FIG. 4 illustrates a schematic diagram of the oil and gas well system having the fiber-optic sensor array and a controlled seismic source, in accordance with embodiments of the present disclosure.

In addition, although described primarily herein as being applied to passive seismic data measurement and analysis (e.g., without using controlled seismic sources), in other embodiments, the techniques described herein may be applied to active seismic data measurement and analysis. For example, FIG. 4 illustrates a schematic diagram of the oil and gas well system 10 having the sensor array 12 and a controlled seismic source 54, which may be activated to generate a seismic wavefield 34 traveling downward into subsurface layers 56, 58 of the subterranean formation 18. When the seismic wavefield 34 arrives at a first reflector 60 (e.g., between the first and second subsurface layers 56, 58), a portion of seismic energy contained in the seismic wavefield 34 is reflected by the first reflector 60. A first reflected wavefield 62 travels upward and arrives at the sensor array 12, where it is measured by a corresponding sensor (e.g., one of the fiber-optic sensors 20). Another portion of the seismic energy contained in the seismic wavefield 34 may be transmitted through the first reflector 60 into the second subsurface layer 58. A transmitted wavefield 64 travels downward and arrives at a second reflector 66 (e.g., at the bottom of the second subsurface layer 58), where a portion of seismic energy contained in the transmitted wavefield 64 is reflected by the second reflector 66. A second reflected wavefield 68 travels upward and arrives at the sensor array 12, where it is measured by another corresponding sensor. An offset 70 may represent a distance between the controlled seismic source 54 and a location (e.g., an entrance of the borehole 14) where the sensor array 12 is lowered into the borehole 14.

It should be noted that the illustrated seismic source 54 is an example of a seismic source deployment. Different source deployment may be employed during the borehole seismic acquisition. In certain embodiments, the seismic source 54 may be a vibrator transported by a truck. In addition, in certain embodiments, the seismic source 54 may be dynamite buried at a certain depth (e.g., 5 meters). It will be appreciated that the alternative embodiments illustrated in FIGS. 2 and 3 relative to the embodiment illustrated in FIG. 1 may also be similarly implemented for the embodiment illustrated in FIG. 4.

FIGS. 5A through 5D illustrate various workflows for processing and transmitting passive seismic monitoring data from an oil and gas well site 72 (e.g., such as the oil and gas well sites illustrated in FIGS. 1-4). In particular, FIGS. 5A through 5D illustrate data and processing flow models for DAS data acquired by a fiber optics system, as illustrated in FIGS. 1-4. For example, one or more data acquisition machines 74 (e.g., including the interrogator 24 illustrated in FIGS. 1-4) may collect raw passive seismic monitoring data 76 at the oil and gas well site (e.g., on-site) and, in certain embodiments, one or more computers 78 (e.g., including the control system 36 illustrated in FIGS. 1-4) may process the raw passive seismic monitoring data to generate processed data 80 and/or generate metadata 82 relating to the raw passive seismic monitoring data 76 at the oil and gas well site (e.g., on-site). As illustrated, these various types of data may be streamed from the oil and gas well site 72 to an off-site (e.g., remote) data processing center 50, where the received data may be further processed by one or more computers 84 of the data processing center 50.

Historically, acquired data are streamed to an off-site (e.g., remote) computation center as raw (e.g., non-processed) data, or only processed data are streamed to an office of offsite computation center (e.g., as illustrated in FIGS. 5A and 5B). In the case of passive seismic monitoring data, the processed data 80 includes "event" waveform data, which are extracted from continuous recording. One purpose of transmitting the "event" data is to optimize the limited bandwidth available for streaming. This approach calls for some type of event detection to occur on location/at the edge. In contrast, as illustrated in FIG. 5C, in certain embodiments, the whole process may be completed at the oil and gas well site 72 (e.g., as an edge computation model), and only processed results may be streamed as metadata 82 from the oil and gas well site 72 to the off-site data processing center 50.

As illustrated in FIG. 5D, the embodiments described herein may further improve the workflow illustrated in FIG. 5C. As illustrated in FIG. 5D, raw seismic data 76 is first acquired using a distributed acoustic sensing system (e.g., such as illustrated in FIGS. 1-4) (Step 1). Then, certain types of data may be generated from processing of the raw seismic data 76, including processing the raw seismic data 76 to generate metadata 82 (e.g., including noise level, in certain situations) as well as enhancing the nature of the raw seismic data 76 (e.g., stacking the raw seismic data 76 to increase the signal-to-noise ratio, followed by reducing the number of sample, in certain situations) (Step 2). In certain embodiments, other types of processing may be applied. Then, the outputs from Step 2 may be concatenated (Step 3) and streamed from the oil and gas well site 72 to the off-site data processing system 50 (Step 4). Then, the output from Step 4 may be processed at the off-site data processing center 50 using either the processed raw data 80, the metadata 82, or both (Step 5). The choice of the data to be processed at the off-site data processing center 50 depending on the particular needs of the data consumers (e.g., in a "pay-per-view" a la carte fashion).

FIGS. 6A and 6B illustrate an example of output generated at Step 3 of the workflow illustrated in FIG. 5D, described above. As illustrated, the raw seismic data 76 may contain an entire section of the DAS array, all of which is not necessary for seismic processing. Therefore, in certain embodiments, a depth window may applied. Then, signal processing may be used to generate two sets of processed waveforms 80A, 80B. The first processed waveform 80A is the stacking of neighboring traces to cancel noise ("Processed Seismic(1)"). This processed waveform 80A helps identify the arrival of the seismic signal. The other processed waveform 80B may be determined by applying deep learning technology to the raw seismic data 76 to identify the potential arrival of the seismic signal ("Processed Seismic (2)"). It will be appreciated that, in certain embodiments, more than two processed waveforms may be generated as part of the processed data 80.

In addition, in certain embodiments, the root-mean-squared (RMS) amplitude of the whole raw seismic data 76 trace may be computed to estimate the noise level, which may be added as metadata 82. The process of adding metadata 82 to the output, along with the processed waveforms 80A, 80B is substantially similar to the addition of certain different types of metadata to pictures taken on a mobile phone, such as location, time stamp, user name, and so forth, attached to the picture.

Figure 7A:
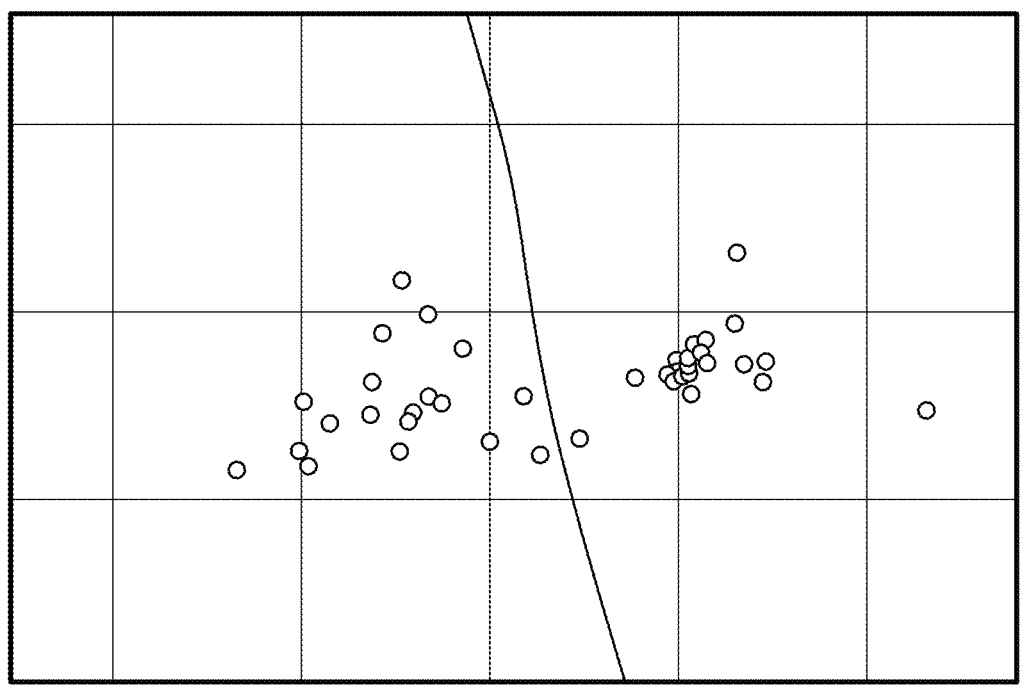
FIGS. 7A and 7B illustrate processing results for processed waveforms illustrated in FIG. 6B, in accordance with embodiments of the present disclosure.
Figure 7B:
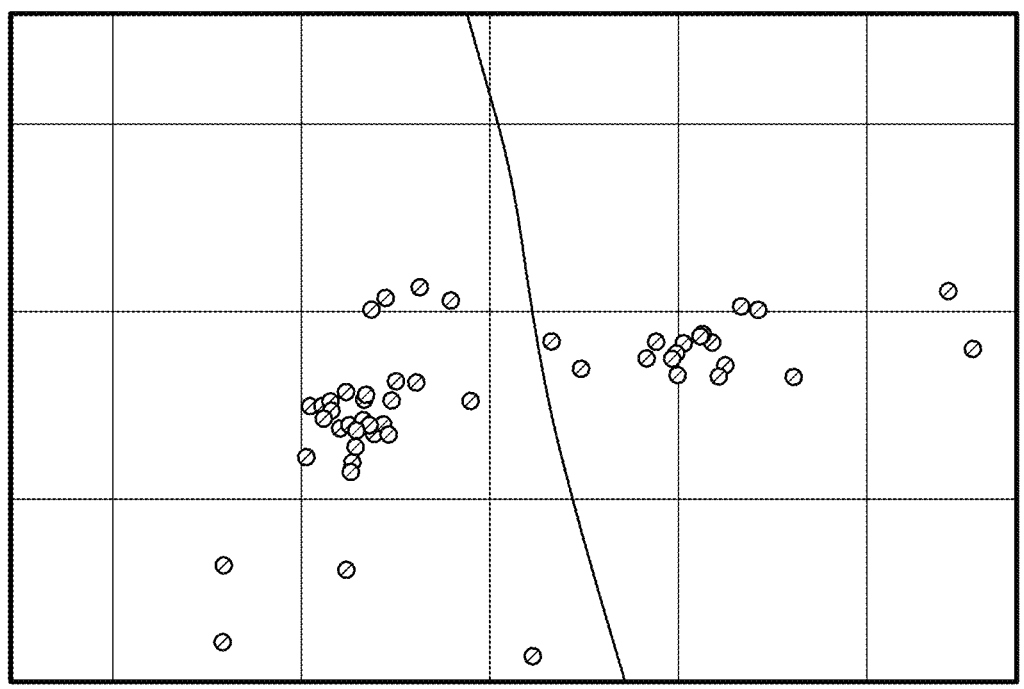

Once the metadata 82 is added to the processed data 80, the resulting output file may be sent to the off-site data processing center 50, and the seismic event locations for the combined data may be computed by the off-site data processing center 50. FIGS. 7A and 7B illustrate the processing results for "Processed Seismic(1)" (i.e., processed waveform 80A) and "Processed Seismic(2)" (i.e., processed waveform 80B), respectively. For example, FIGS. 7A and 7B are map views of events for a 20 minute long acquisition window of DAS data. As illustrated, the seismic event locations indicated by the two processed waveforms 80A, 80B are comparable. However, the details are slightly different. For example, the "Processed Seismic(2)" shows more events than "Processed Seismic(1)". In addition, in certain embodiments, the results of FIGS. 7A and 7B may benefit from additional processing techniques performed at the off-site data processing center 50 to provide additional refinement. Therefore, customized processing of seismic data may be performed at the discretion of the particular users at various off-site data processing centers 50.

Figure 8:
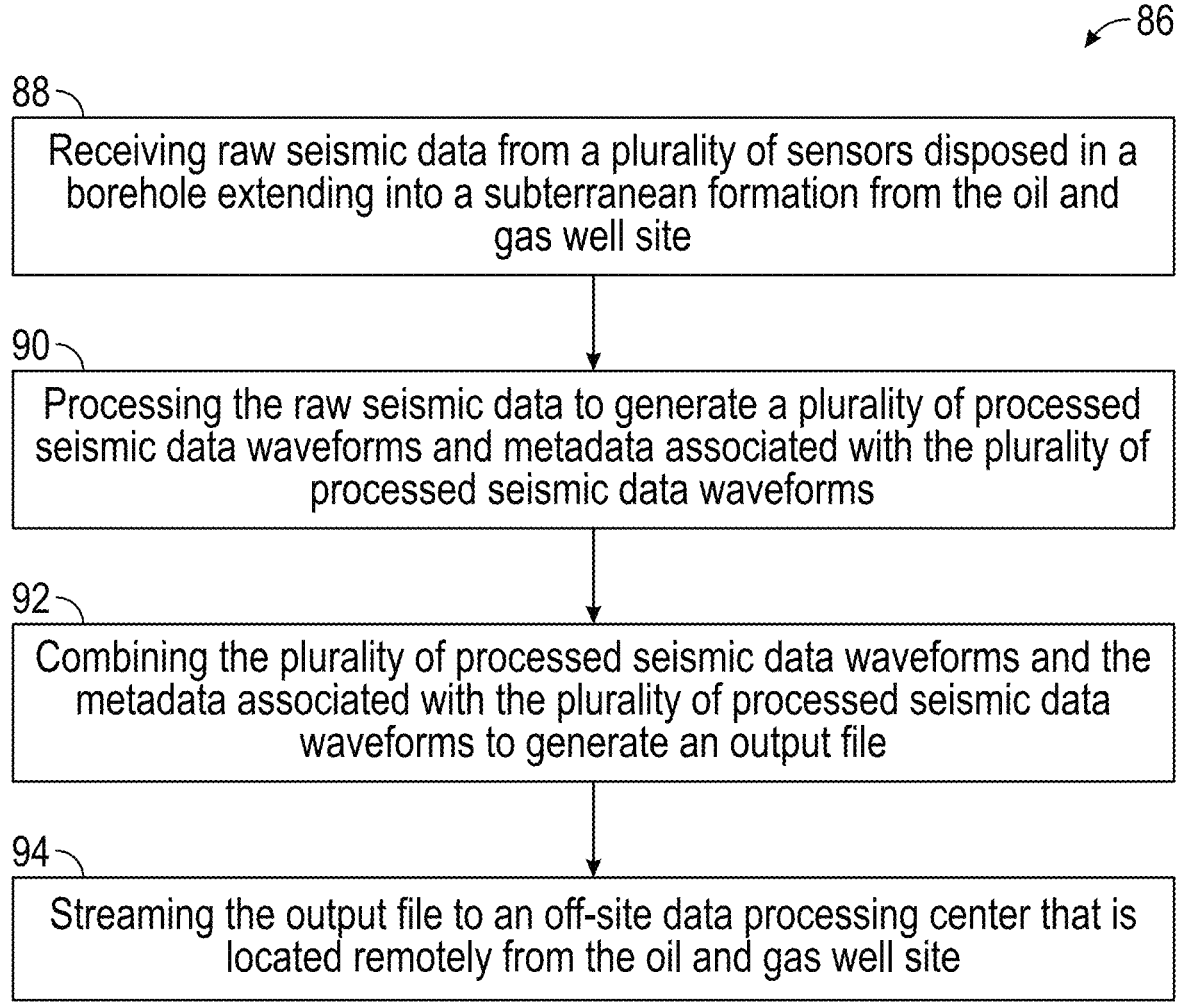
FIG. 8 is a flow diagram of a method for operating a control system, in accordance with embodiments of the present disclosure.

FIG. 8 is a flow diagram of a method 86 for operating the control system 36, as described in greater detail herein. In certain embodiments, the method 86 may include receiving raw seismic data 76 from a plurality of sensors 20 disposed in a borehole 14 extending into a subterranean formation 16 from the oil and gas well site (step 88). In addition, in certain embodiments, the method 86 may include processing the raw seismic data 76 to generate a plurality of processed seismic data waveforms 80A, 80B and metadata 82 associated with the plurality of processed seismic data waveforms 80A, 80B (step 90). In addition, in certain embodiments, the method 86 may include combining the plurality of processed seismic data waveforms 80A, 80B and the metadata 82 associated with the plurality of processed seismic data waveforms 80A, 80B to generate an output file (step 92). In addition, in certain embodiments, the method 86 may include streaming the output file to an off-site data processing center 50 that is located remotely from the oil and gas well site (step 94).

In addition, in certain embodiments, the raw seismic data may include distributed acoustic sensing (DAS) data collected by a plurality of fiber-optic sensors 20. In addition, in certain embodiments, the raw seismic data 76 may include passive seismic data. However, in other embodiments, the raw seismic data 76 may include seismic data caused by a controlled seismic source 54.

In addition, in certain embodiments, processing the raw seismic data 76 may include stacking neighboring traces of the raw seismic data 76 to cancel noise in a first processed seismic waveform 80A; and applying deep learning technology to the raw seismic data 76 to identify a potential arrival of a seismic signal in a second processed seismic waveform 80B. In addition, in certain embodiments, processing the raw seismic data 76 may include computing a root-mean-squared (RMS) amplitude of the raw seismic data 76 to estimate a noise level; and generating the metadata 82 associated with the plurality of processed seismic data waveforms 80A, 80B based at least in part on the estimated noise level.

In addition, in certain embodiments, the method 86 may include automatically adjusting one or more operating parameters of the oil and gas well site based at least in part on the plurality of processed seismic data waveforms 80A, 80B and the metadata 82 associated with the plurality of processed seismic data waveforms 80A, 80B.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
disposing a plurality of sensors within a borehole extending into a subterranean formation at an oil and gas well site, wherein the plurality of sensors comprise fiber-optic sensors;
receiving, by a processor, raw seismic data from the plurality of sensors, wherein the raw seismic data comprises distributed acoustic sensing (DAS) data collected by the plurality of sensors;
processing, by the processor, the raw seismic data to generate a plurality of processed seismic data waveforms and metadata associated with the plurality of processed seismic data waveforms, the processing the raw seismic data comprising:
stacking neighboring traces of the raw seismic data to cancel noise in a first processed seismic waveform; and
applying deep learning technology to the raw seismic data to identify a potential arrival of a seismic signal in a second processed seismic waveform;
combining, by the processor, the plurality of processed seismic data waveforms and the metadata associated with the plurality of processed seismic data waveforms to generate an output file; and
streaming, by the processor, the output file to an off-site data processing center that is located remotely from the oil and gas well site.

2. The method of claim 1, wherein the raw seismic data comprises passive seismic data.

3. The method of claim 1, wherein the raw seismic data comprises seismic data caused by a controlled seismic source.

4. The method of claim 1, wherein the processing the raw seismic data further comprises:
computing a root-mean-squared (RMS) amplitude of the raw seismic data to estimate a noise level; and
generating the metadata associated with the plurality of processed seismic data waveforms based at least in part on the estimated noise level.

5. The method of claim 1, further comprising:
coupling the plurality of sensors to an interrogator;
providing, by the interrogator, light signals to the plurality of sensors; and
detecting and recording, by the interrogator, back scattered light signals from the plurality of sensors.

6. The method of claim 5, further comprising:
automatically adjusting one or more operating parameters of the interrogator based at least in part on the plurality of processed seismic data waveforms and the metadata associated with the plurality of processed seismic data waveforms.

7. A method comprising:
disposing a plurality of sensors within a borehole extending into a subterranean formation at an oil and gas well site;
coupling the plurality of sensors to an interrogator, wherein the plurality of sensors comprise fiber-optic sensors;
providing, by the interrogator, light signals to the plurality of sensors;
detecting and recording, by the interrogator, back scattered light signals from the plurality of sensors;
receiving, by a processor, raw seismic data from the plurality of sensors;
processing, by the processor, the raw seismic data to generate a plurality of processed seismic data waveforms and metadata associated with the plurality of processed seismic data waveforms, the processing the raw seismic data comprising:
stacking neighboring traces of the raw seismic data to cancel noise in a first processed seismic waveform; and
applying deep learning technology to the raw seismic data to identify a potential arrival of a seismic signal in a second processed seismic waveform;
combining, by the processor, the plurality of processed seismic data waveforms and the metadata associated with the plurality of processed seismic data waveforms to generate an output file; and
streaming, by the processor, the output file to an off-site data processing center that is located remotely from the oil and gas well site.

8. The method of claim 7, further comprising:
automatically adjusting one or more operating parameters of the interrogator based at least in part on the plurality of processed seismic data waveforms and the metadata associated with the plurality of processed seismic data waveforms.

9. The method of claim 7, wherein the raw seismic data comprises passive seismic data.

10. The method of claim 7, wherein the raw seismic data comprises seismic data caused by a controlled seismic source.

11. The method of claim 7, wherein the processing the raw seismic data comprises:
- computing a root-mean-squared (RMS) amplitude of the raw seismic data to estimate a noise level; and
- generating the metadata associated with the plurality of processed seismic data waveforms based at least in part on the estimated noise level.

* * * * *